US012565075B2

(12) United States Patent
Spühler et al.

(10) Patent No.: US 12,565,075 B2
(45) Date of Patent: Mar. 3, 2026

(54) VEHICLE WITH ONE FRONT AXLE AND AT LEAST TWO SUSPENDED REAR AXLES

(71) Applicant: ZF Friedrichshafen AG, Friedrichshafen (DE)

(72) Inventors: Stefan Spühler, Markdorf (DE); Eike Helm, Diepholz (DE); Konrad Feyerabend, Hannover (DE); Johann Lucas, Sehnde (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/980,166

(22) Filed: Dec. 13, 2024

(65) Prior Publication Data

US 2025/0196561 A1     Jun. 19, 2025

(30) Foreign Application Priority Data

Dec. 15, 2023   (DE) ..................... 10 2023 212 769.5

(51) Int. Cl.
  *B60G 17/0195*     (2006.01)
  *B60G 17/015*     (2006.01)
  *B60G 17/016*     (2006.01)
  *B60K 1/02*     (2006.01)

(52) U.S. Cl.
  CPC ..... *B60G 17/0195* (2013.01); *B60G 17/0155* (2013.01); *B60G 17/016* (2013.01); *B60K 1/02* (2013.01); *B60G 2202/152* (2013.01)

(58) Field of Classification Search
  CPC ........... B60G 17/0195; B60G 17/0155; B60G 17/016; B60G 2202/152; B60K 1/02
  See application file for complete search history.

(56) References Cited

U.S. PATENT DOCUMENTS

| | | | |
|---|---|---|---|
| 11,440,413 B2 | 9/2022 | Csontos et al. | |
| 11,808,331 B2 * | 11/2023 | Mattsson | B60K 17/00 |
| 11,845,503 B2 * | 12/2023 | Seeger | B60G 17/0161 |
| 2025/0115201 A1 * | 4/2025 | Mortenson | B60R 16/033 |

FOREIGN PATENT DOCUMENTS

| | | | |
|---|---|---|---|
| DE | 10 2015 000 215 A1 | 7/2016 | |
| DE | 10 2019 214 507 A1 | 3/2021 | |
| WO | WO-2023202830 A1 * | 10/2023 | B60L 15/2063 |

OTHER PUBLICATIONS

German Patent Office, German Search Report issued in German patent application No. 10 2023 212 769.5 (Jun. 24, 2024).

* cited by examiner

*Primary Examiner* — Faye M Fleming
(74) *Attorney, Agent, or Firm* — Finch & Maloney PLLC

(57)     ABSTRACT

For a vehicle with a front axle (1) and at least two suspended rear axles (2, 3), a level relative to the roadway can be adjusted by controlling pressurized suspension elements (7, 8) arranged on the rear axles (2, 3), where the rear axles (2, 3) are each driven electrically by an electric motor (10) controlled by at least one control unit (11). A separate transmission (13) with a shifting element that operates with interlock is associated with each rear axle (2, 3), and at least one control device (15) is associated with the rear axles (2, 3). The control device is designed to detect the occurrence of a shifting process at one of the rear axles (2, 3), and as a function of the occurrence of the shifting process, to reduce the pressure of the pressurized suspension elements (7, 8) of the rear axle (2, 3) being shifted and to increase the pressure of the pressurized suspension elements (7, 8) of the other rear axle (2, 3).

15 Claims, 1 Drawing Sheet

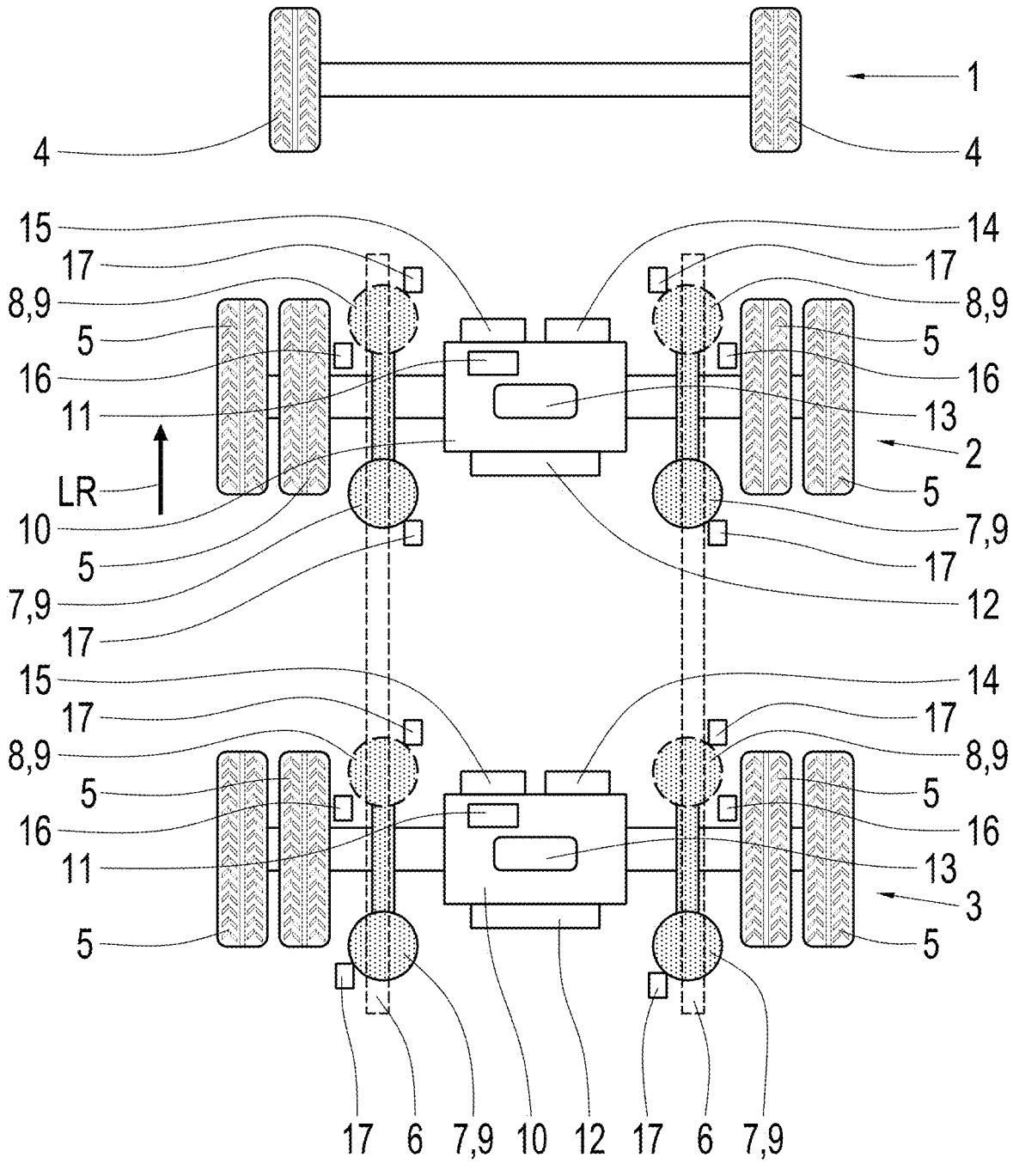

VEHICLE WITH ONE FRONT AXLE AND AT LEAST TWO SUSPENDED REAR AXLES

RELATED APPLICATIONS

This application claims the benefit of and right of priority under 35 U.S.C. § 119 to German Patent Application no. 10 2023 212 769.5, filed on 15 Dec. 2023, the contents of which are incorporated herein by reference in its entirety.

FIELD OF THE DISCLOSURE

The invention relates to a vehicle, in particular a utility vehicle, with a front axle and at least two suspended rear axles, according to the present disclosure. In addition, a method for operating a vehicle with a front axle and at least two suspended rear axles is an object of the present invention.

BACKGROUND

DE 10 2017 213 199 A1 discloses a vehicle with a front axle and at least two suspended rear axles whose level relative to the road can be adjusted by controlling pressure-actuated suspension elements arranged on the rear axles, wherein the rear axles are in each case driven electrically by a controlled electric motor. When recuperative operation is recognized, the level relative to the road is adapted by means of an adjusting mechanism in order to optimize the recuperation by adjusting the axle loads.

DE 10 2015 000 215 A1 has as its object a method for controlling a vehicle with a front axle and at least two suspended rear axles, each rear axle being driven electrically by a controlled electric motor. The vehicle comprises a pneumatic suspension unit which is configured to distribute the axial load between the suspended rear axles. By means of the method a consumption-optimized operation of the vehicle should be achieved, in that a specified overall torque is divided as a function of detected axle load values into target torques which are applied to the driven rear axles.

SUMMARY

A separate transmission with a shifting element that works with interlock can be assigned to each driven rear axle. During a shifting process, a traction force interruption takes place at one of the driven rear axles, by virtue of the interlocking shifting element. To compensate for this traction force interruption, an increased torque is applied to the other driven rear axle, but depending on the operating and driving situation, this can lead to slippage. The result is that during the shifting process the traction force collapses more severely than the traction force collapse that can be attributed to the traction force interruption at the other rear axle.

Starting from the above-described prior art, it is now the purpose of the present invention to develop further a vehicle that avoids the disadvantages of the prior art.

From the equipment standpoint, this objective is achieved by a vehicle with a front axle and at least two suspended rear axles as disclosed herein. From the process standpoint, the objective is achieved by a method as disclosed herein. Advantageous further developments of the invention will be apparent from the present disclosure.

According to the invention, a vehicle is proposed, in particular a vehicle with a front axle and at least two suspended rear axles, whose level relative to the road can be adjusted by controlling pressurized suspension elements arranged on the rear axles, wherein each of the rear axles is driven electrically by an electric motor controlled by a control unit and wherein a separate transmission with an interlocking shifting element is associated with each rear axle. According to the invention, it is provided that the rear axles are associated with at least one control device, which is designed to detect the occurrence of a shifting process at one of the rear axles and as a function of the occurrence of the shifting process in order to reduce the pressure of the pressurized suspension element of the rear axle being shifted and to increase the pressure of the pressurized suspension element of the other rear axle.

The increase of the axial load on the driven rear axle is intended to compensate the traction force interruption at the rear axle being shifted by virtue of a higher torque, by increasing the pressure in the pressurized suspension element, and results in a reduction and/or delay of the occurrence of slippage by the wheels of that rear axle. At the rear axle being shifted, the pressure in the pressurized suspension element is reduced and the pressure in the pressurized suspension element of the other rear axle is increased, which takes on the propulsion until the target rotation speed for the new gear of the rear axle shifted has been reached. In that way, discomfort due to traction force interruption can at least be minimized.

Preferably, the vehicle has a 6×4 axle configuration. With a 6×4 configuration, two wheels are arranged on a steered axle and four drive wheels are arranged on the driven rear axles behind the steered axle.

The interlocking shifting element of the transmission can in particular be a claw-type shifting element.

The pressure of the pressurized suspension element of the other rear axle can be increased in a linear or a non-linear manner.

In particular, the at least one control device can be designed to analyze a currently existing driving situation and, as a function of the driving situation determined, to vary a pressure ratio between the suspension elements of the rear axles. This enables a flexible adaptation to different driving situations in order to optimize the driving stability.

In this, the driving situation analyzed can be driving on a road, during which the at least one control device increases the pressure of the suspension element associated with one of the rear axles compared with the other rear axle with a higher axle load, by controlling the pressurization of the one rear axle. In particular, starting from the front axle, the last driven axle as viewed in the longitudinal direction of the vehicle can be acted upon by a higher axial load compared with the at least one rear axle farther in front of it. That contributes toward increasing the driving stability.

Furthermore, the driving situation analyzed can be a maneuvering process in which the at least one control device relieves the load on one of the rear axles by controlling the pressurization of the suspension element associated with that rear axle. In particular, in the driving situation of maneuvering, the last driven axle as viewed in the longitudinal direction of the vehicle can be relieved of load by controlling the pressurization of the suspension element associated with that rear axle. The unloading of the last driven rear axle reduces the grinding during maneuvering processes. This can occur in particular with axle arrangements in which there are twin wheels at each end of the rear axles, which are used to increase the load-bearing capacity of heavy-load vehicles. Typically, the wheel pairs at each end of the rear axles are fixed to one another so that they rotate together about an axis. Large steering maneuvers during maneuvering processes result in greater tire wear due to the grinding or dragging.

According to a further development, the at least one control device can pressurize one of the rear axles by controlling the suspension element associated with that rear axle with a maximum permissible axle load and correspondingly transferring the rest of the axle load to be distributed to the at least one further rear axle by controlling the pressurization of the suspension element associated with the at least one further rear axle. This is based on the fact that one of the rear axles, as the main rear axle, always carries the maximum axle load and the remaining axle load is distributed to the at least one further rear axle, whereby an optimization of the traction during regular driving operation can be achieved. In that case, it can be provided that for an equalization of the wear the driven rear axles are pressurized cyclically in alternation as the main drive axle with the maximum axle load during driving operation.

Preferably, the driving situation analyzed can be a starting process on level ground, during which the at least one control device imposes a maximum permissible load on one of the rear axles by controlling the pressurization of the suspension element associated with that rear axle, whereas a control unit applies a torque to the rear axle by controlling its electric motor, which torque is greater than the torque on the at least one other rear axle. On ground that is slippery, for example due to packed snow or due to the condition of the ground, the traction when starting off may be less than required in order to transmit a traction force to the ground, or even non-existent. Wheels on the driven rear axles will then sometimes spin while driving and starting off the vehicle is made more difficult or even prevented. This can be overcome by controlling the pressurization of the suspension element associated with the axle concerned to a maximum permissible axle load, whereas by controlling the electric motor of that axle the control unit applies to the axle a torque greater than the torque on the at least one further rear axle. By virtue of the load transfer to one rear axle and by driving that axle with a greater torque, in this starting-assistance mode, an optimum traction for starting on slippery ground can be achieved.

In particular, the driving situation analyzed can be a starting process on loose and/or uneven ground, while the at least one control device is imposing a uniformly distributed axle load on the rear axles by controlling the pressurization of the suspension elements associated therewith, wherein by controlling the electric motors of the rear axles a uniformly distributed torque is applied to the axles by controlling their electric motors. In that way, an equal distribution of axle loading and traction at all the driven rear axles can be achieved, so that in this starting-assistance mode starting on loose and/or uneven ground is supported.

Furthermore, if during the starting process repeatedly occurring slippage of wheels of the driven rear axles is detected, then the at least one control device acts upon the suspension elements associated with the rear axles in such manner as to switch back and forth between the control modes for starting on loose and/or uneven ground and starting on slippery ground. For that purpose, wheel rotation speed sensors can be associated with the wheel or wheel pairs of the rear axle concerned. Using the rotation speed signal generated by the wheel rotation speed sensors, which indicate a wheel rotation speed, the spinning of wheels or wheel pairs can be quickly and simply detected. The wheel rotation speed sensors can be known wheel rotation speed sensors of an anti-block system (ABS), for example. By changing between the starting support modes between the driven rear axle, better acceleration conditions of the vehicle can be achieved even in difficult starting conditions.

In particular, the at least one control device can be designed to evaluate signals from pressure sensors of the suspension elements in order to determine existing axle loads on the driven rear axles. In particular, the at least one control device can control the axle load distribution as a function of the axle loads determined. This can preferably be used for the various driving situations in as well as for the starting support modes, according to the present disclosure.

In another preferred further development, a transmission control unit of the electric motor concerned can control the transmission of the rear axles concerned and send a control signal to the control device for evaluation. In that way, an anticipatory control of the pressurized suspension elements arranged on the rear axles can be achieved. Thus, a preparatory reaction to a change of an existing driving situation, such as switching for a gearshift, can be carried out. The control device can control the pressurization of the suspension element proactively, i.e., in advance.

Preferably each rear axle can have at least two pressurized suspension elements. More preferably still, each rear axle can have four suspension elements.

In particular, the suspension elements can be in the form of pneumatic or hydraulic suspension elements. Pneumatic suspension elements can in particular be air spring bellows. Hydraulic suspension elements can be in the form of hydraulic cylinders with springs.

In a preferred further development, each driven axle can have a control unit which is designed to control the respective electric motor, wherein the function of the control device is integrated in the control unit concerned. In that way, the number of hardware elements required can be reduced.

A method is proposed for operating a vehicle with a front axle and at least two suspended rear axles, whose level relative to the road is adjusted by the control of pressurized suspension elements arranged on the rear axles, wherein the rear axles are each driven electrically by an electric motor controlled by at least one control unit, wherein a separate transmission with a shifting element that works with interlock is associated with each rear axle, wherein at least one control device is associated with each rear axle, by means of which the occurrence of a shifting process at one of the rear axles is detected and as a function of the occurrence of the shifting process the pressure of pressurized suspension elements of the rear axle being shifted is reduced and the pressure of pressurized suspension elements of the other rear axle is increased. Reference can be made to the advantages of the vehicle according to the invention.

The invention is not limited to the indicated combination of features in the claims. There are also possibilities for combining individual features with one another, provided that they emerge from the claims, the description of preferred embodiments of the invention given below, or directly from the drawings. References in the claims to the drawings by the use of indexes are not intended to restrict the protective scope of the claims.

BRIEF DESCRIPTION OF THE DRAWINGS

An advantageous embodiment of the invention, which is explained in what follows, is illustrated in the sole FIGURE, which shows:

FIG. 1: Schematically and as an example, a representation of a 6×4-axle configuration of a vehicle.

DETAILED DESCRIPTION

FIG. 1 shows, schematically and as an example, a 6×4-axle configuration of an electrically driven vehicle (no more of which is shown), preferably a utility vehicle.

The vehicle has a front axle 1 and at least two suspended rear axles 2, 3. The only schematically represented front axle 1 is in the form of a steered axle. The two rear axles 2 and 3 are arranged one behind the other as viewed in the longitudinal direction LR of the vehicle.

In the 6×4-axle configuration, two wheels 4 are fitted on the front axle 1 in the form of a steered axle and four drive wheels 5 on the driven rear axles 2, 3 behind the front axle 1. The rear axles 2, 3 are arranged on a vehicle chassis 6.

The level relative to the road can be adjusted by controlling pressurized suspension elements 7 arranged on the rear axles 2, 3. For that purpose, each rear axle 2, 3 has at least two suspension elements 7. Optionally, two further suspension elements 8 can be arranged on each rear axle 2, 3, as illustrated in FIG. 1 by the representation of the suspension elements 8 using broken lines.

The suspension elements 7, 8 can be in the form of pneumatic or hydraulic suspension elements 7, 8. In the example embodiment illustrated, the suspension elements 7, 8 are in the form of air spring bellows 9. In a version using hydraulic suspension elements 7, 8 these can in each case be in the form of a hydraulic cylinder with a spring. For supplying pressure to the pneumatic suspension elements 7, 8 when these are in the form of air spring bellows 9, at least one pneumatic pressure source is provided. To control or regulate the pressure, valve arrangements are associated with the air spring bellows 9, which are designed to pressurize the air spring bellows 9 with compressed air from the at least one pressure source and to vent the air spring bellows 9.

Each of the at least two driven rear axles 2, 3 is electrically driven by just one electric motor 10 controlled by at least one control unit 11. Furthermore, each electric motor 10 has a power electronics system 12. The purpose of the power electronics system 12, among others, is to convert the direct current from at least one battery of the vehicle to alternating current for use in the electric motor 10.

Each of the at least two driven axles 2, 3 is associated with a separate transmission 13 comprising a shifting element that works with interlock. The interlocking shifting element of the transmission 13 can in particular be a claw-type shifting element. In utility vehicles, owing to the high traction force demand, as a rule three-gear transmissions are used, which have two forward gears and one reversing gear. A transmission control unit of the respective electric motor 10 controls the transmission 13 of the rear axle 2, 3 concerned. The transmission control unit can be integrated in the control unit 11.

In addition, a power take-off 14 can be provided on a drive input shaft of the electric motor 10 concerned, for example for a hydraulic pump.

To control the pressurized suspension element 7, 8 arranged on the rear axles 2, 3 in order to adjust the level relative to the road, at least one control device 15 is associated with the rear axles 2, 3. Preferably, a separate control device 15 is associated with each of the rear axles 2, 3.

Wheel rotation speed sensors 16 can be associated with at least one wheel 5 or exactly one wheel pair of the respective rear axle 2, 3. Using the rotation speed signals generated by the wheel rotation speed sensors 16, which can display a wheel rotation speed, any spinning of the wheels 5 or wheel pairs can be detected quickly and simply. The wheel rotation speed sensors can be, for example, the known wheel rotation speed sensors of an anti-block (ABS) system. The signals from the wheel rotation speed sensors 16 are sent to the respective control device 15 and/or to the respective control unit 11 of the rear axles 2, 3 for evaluation.

The at least one control device 15 is designed to evaluate signals from pressure sensors 17 of the suspension elements 7, 8 in order to determine existing axle loads on the driven rear axles 2, 3. In addition, the control device 15 is designed to control the valve arrangements associated with the air spring bellows 9 in order, by changing the air pressure, to adapt the axle loads carried by the driven axles 2, 3.

When a gearshift is carried out at one of the driven axles 2, 3, the torque at the other driven axle 2, 3 is significantly increased in order to compensate for the traction force interruption during the shifting process. To prevent slip from taking place during the boosted operation of that driven axle 2, 3, which would be attributable to a friction value that is too low and/or to an axle load also too low, which would exacerbate the traction force interruption, it is provided that the control device 15 is designed to detect the occurrence of a shifting process at the one rear axle 2, 3 concerned and, as a function of the occurrence of the shifting process, to reduce the pressure of the pressurized suspension elements 7, 8 of the rear axle being shifted and to increase the pressure of the pressurized suspension elements 7, 8 of the other rear axle 2, 3.

To determine the occurrence of a shifting process at one of the driven rear axles 2, 3, the transmission control unit of the electric motor 10 concerned can send a control signal for controlling the respective transmission 13 in parallel, particularly in advance, for evaluation in the control device 15. In that way a proactive or anticipatory activation of the pressurized suspension elements 7, 8 arranged on the rear axles 2, 3 can be carried out. Thus, a preparatory reaction to a change of an existing driving situation, such as switching for a gearshift, can be carried out. For that purpose, the activation of the pressurized suspension elements 7, 8 by the control device 15 can be initiated in order to reduce the pressure of the pressurized suspension element 7, 8 of the rear axle 2, 3 being shifted and to increase the pressure of the pressurized suspension element 7, 8 of the other rear axle 2, 3.

Furthermore, the at least one control device 15 can be designed to analyze a currently existing driving situation and, as a function of the driving situation determined, to vary a pressure ratio between the suspension elements 7, 8 of the driven rear axles 2, 3.

For that purpose, the at least one control device 15 is designed to evaluate sensor signals sent by sensor devices of the vehicle, namely the wheel rotation speed sensors 16 and the pressure sensors 17, in order to analyze the currently existing driving situation. In addition, the control signals provided by the transmission control unit can be taken into account in analyzing the currently existing driving situation.

If the driving situation analyzed is driving on a roadway, then while driving on the road the at least one control device 15 can impose a heavier axle load on one of the rear axles 2, 3 compared with the other rear axle 2, 3 by controlling the pressurization of the suspension elements 7, 8 associated with that rear axle 2, 3. In particular, the last driven rear axle 3 as viewed looking from the front axle in the longitudinal direction LR can be given a higher axle load than the other rear axle 2 farther in front. This contributes toward increasing the driving stability.

When the driving situation analyzed is a maneuvering process, it is advantageous if while maneuvering the at least one control device 15 reduces the load on one of the rear axles 2, 3 by controlling the pressurization of the suspension element 7, 8 associated with that rear axle 2, 3. That a maneuvering process is taking place can be concluded from the control signal generated by the transmission control unit, since maneuvering often involves gearshifts for forward and reverse driving at low speeds.

Furthermore, the at least one control device 15 acts upon one of the rear axles 2, 3, preferably the rear axle 2 nearer the front as viewed in the longitudinal direction LR of the vehicle, by controlling the suspension elements 7, 8 associated with that rear axle 2, with a maximum permissible axle load, and upon the at least one further rear axle 3, by controlling the pressurization of the suspension element 7, 8 associated with the at least one further rear axle 3, in accordance with the remaining load of the vehicle to be distributed.

A driving situation analyzed by the control device 15 is a starting process on slippery ground. On ground that is slippery, for example due to packed snow or due to the condition of the ground, the necessary traction for starting, the transmission of a traction force to the ground, can be poor or even non-existent. In a starting support mode it is provided that the at least one control device 15 acts upon one of the rear axles 2, 3 by controlling the pressurization of the suspension elements 7, 8 associated with that axle with a maximum permissible axle load, whereas in this starting support mode the at least one control unit 11, by controlling the electric motor 10 of the rear axle 2, 3, applies to that rear axle 2, 3 a higher torque than the at least one further rear axle 2, 3.

A further driving situation analyzed by the control device 15 can be a starting process on loose and/or uneven ground. To support the starting process, the at least one control device 15 imposes upon the rear axles 2, 3 a uniformly distributed axle load by controlling the pressurization of the suspension elements 7, 8 associated with them. In parallel, the at least one control unit 11 can apply a uniformly distributed torque by controlling the electric motors 10 of the rear axles 2, 3.

Furthermore, if during the starting process repeatedly occurring slip at the drive wheels 5 of the driven rear axles 2, 3 is detected, the at least one control device can control the suspension elements 7, 8 associated with the rear axles 2, 3 and the at least one control unit 11 in such manner as to change between the control mode when starting on loose and/or uneven ground and the control mode when starting on slippery ground.

INDEXES

1 Front axle
2 Rear axle
3 Rear axle
4 Wheel
5 Drive wheel
6 Vehicle chassis
7 Suspension element
8 Suspension element
9 Air-spring bellows
10 Electric motor
11 Control unit
12 Power electronics
13 Transmission
14 Power take-off
15 Control device
16 Wheel rotation speed sensor
17 Pressure sensor
LR Longitudinal direction of the vehicle

The invention claimed is:

1. A vehicle comprising:
a front axle;
a control unit;
at least two suspended rear axles each driven electrically by an electric motor controlled by the control unit; and
pressurized suspension elements on the at least two suspended rear axles;
wherein a level of the at least two suspended rear axles relative to the roadway can be adjusted by control of the pressurized suspension elements;
wherein a separate transmission with a shifting element that operates with interlock is associated with each rear axle; and
wherein the at least one control device is configured to detect a shifting process at one of the at least two suspended rear axles and, as a function of the shifting process, is configured to reduce the pressure of the pressurized suspension elements of the rear axle being shifted and to increase the pressure of the pressurized suspension elements of the other rear axle.

2. The vehicle according to claim 1, wherein the control unit is configured to analyze a currently existing driving situation, and as a function of the currently existing driving situation, to vary a pressure ratio between the suspension elements of the rear axles.

3. The vehicle according to claim 2, wherein the control unit is configured to evaluate sensor signals generated by sensor devices of the vehicle, in order to analyze the currently existing driving situation.

4. The vehicle according to claim 2, wherein the currently existing driving situation analyzed is driving on a road, during which the control unit acts upon one rear axle of the at least two suspended rear axles by controlling a pressurization of the suspension elements associated with the one rear axle so as to impose a higher axial load compared with an axial load of another rear axle.

5. The vehicle according to claim 2, wherein the currently existing driving situation analyzed is a maneuvering process, during which the control unit relieves the load on the one rear axle of the at least one suspended rear axles by controlling a pressurization of the suspension elements associated with the one rear axle.

6. The vehicle according to claim 1, wherein the control unit device imposes a maximum permissible axle load on one rear axle of the at least two suspended rear axles by controlling a pressurization of the suspension elements associated with the one of the at least two suspended rear axles, and imposes upon at least one additional axle of the at least two suspended rear axles a load corresponding to the remainder of the vehicle load to be distributed, by controlling the pressurization of the suspension elements associated with the at least one additional axle of the at least two suspended rear axles.

7. The vehicle according to claim 2, wherein the driving situation analyzed is a starting process on slippery ground, during which the at least one control device imposes a maximum permissible axle load on one of the at least two suspended rear axles by controlling the pressurization of the suspension elements associated with the one of the at least two suspended rear axles, whereas the at least one control unit acts upon the one of the at least two suspended rear axles by controlling the electric motor of the one of the at least two suspended rear axles to apply a torque higher than a torque applied to at least one further rear axle of the at least two suspended rear axles.

8. The vehicle according to claim 7, wherein the driving situation analyzed is a starting process on loose and/or uneven ground, during which the at least one control device controls a pressurization of the suspension elements associated with the at least two suspended rear axles so as to impose upon them a uniformly distributed axle load, while the at least one control unit applies a uniformly distributed torque to the at least two suspended rear axles by controlling respective electric motors.

9. The vehicle according to claim 8, wherein the at least one control device is configured to detect repeatedly occurring slip at wheels of the driven axles, the control device is configured to act upon the suspension elements associated with the at least two suspended rear axles and upon at least one control unit in order to change back and forth between the control mode for starting on loose and/or uneven ground and the control mode for starting on slippery ground.

10. The vehicle according to claim 2, wherein the at least one control device is configured to evaluate signals from pressure sensors of the suspension elements, in order to determine the existing axle loads on the driven rear axles.

11. The vehicle according to claim 1, wherein a transmission control unit of the respective electric motor is configured to control each transmission of the at least two suspended rear axles and configured to send a control signal to the control device for evaluation.

12. The vehicle according to claim 1, wherein each rear axle has at least two pressurized suspension elements.

13. The vehicle according to claim 1, wherein the suspension elements are in the form of pneumatic or hydraulic suspension elements.

14. The vehicle according to claim 1, wherein each driven rear axle comprises a control unit configured to control a respective electric motor, and the function of the control device is integrated in the respective control units.

15. A method for operating a vehicle having a front axle and at least two suspended rear axles, the method comprising:

controlling pressurized suspension elements arranged on the rear axles to thereby adjust a level of at least two suspended rear axles have relative to the road;

electrically driving the at least two suspended rear axles by a respective electric motor controlled by at least one control unit and wherein a separate transmission is associated with each rear axle;

detecting a shifting process at one of the at least two suspended rear axles by at least one control device associated with the rear axles;

reducing a pressure of pressurized suspension elements associated with the one of the at least two suspended rear axles being shifted as a function of the shifting process; and increasing a pressure of pressurized suspension elements associated with other of the at least two suspended rear axles.

* * * * *